United States Patent
Takeshima et al.

(10) Patent No.: US 7,686,121 B2
(45) Date of Patent: Mar. 30, 2010

(54) ALL TERRAIN VEHICLE

(75) Inventors: Masao Takeshima, Saitama (JP); Masatoshi Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 541 days.

(21) Appl. No.: 11/510,678

(22) Filed: Aug. 28, 2006

(65) Prior Publication Data
US 2007/0045017 A1    Mar. 1, 2007

(30) Foreign Application Priority Data
Aug. 31, 2005 (JP) .............................. 2005-252349

(51) Int. Cl.
*B60K 15/04* (2006.01)
*B60K 15/073* (2006.01)

(52) U.S. Cl. .................. 180/291; 180/908; 296/63

(58) Field of Classification Search .............. 180/291, 180/908; 296/63; D12/108, 109, 110, 112, D12/113, 402, 416, 218, 87
See application file for complete search history.

(56) References Cited

U.S. PATENT DOCUMENTS

| | | | | |
|---|---|---|---|---|
| 3,560,047 A | * | 2/1971 | Davis | 297/188.08 |
| 3,627,378 A | * | 12/1971 | Brock | 297/188.07 |
| D276,034 S | * | 10/1984 | Makita et al. | D12/110 |
| 5,094,315 A | * | 3/1992 | Taki et al. | 180/219 |
| 5,133,588 A | * | 7/1992 | Hutchinson et al. | 297/188.07 |
| 5,662,149 A | * | 9/1997 | Armellino | 141/86 |
| 6,651,764 B2 | * | 11/2003 | Fournier et al. | 180/190 |
| 6,708,736 B2 | * | 3/2004 | Bender | 141/86 |
| 7,284,629 B2 | * | 10/2007 | Nakano et al. | 180/68.3 |
| D569,310 S | * | 5/2008 | Ainsworth et al. | D12/110 |
| 7,377,552 B2 | * | 5/2008 | Miyabe | 280/835 |
| 2004/0129484 A1 | * | 7/2004 | Rondeau et al. | 180/312 |
| 2005/0150706 A1 | * | 7/2005 | Eguchi et al. | 180/291 |

FOREIGN PATENT DOCUMENTS

| | | | |
|---|---|---|---|
| JP | 2-158480 A | | 6/1990 |
| JP | 02158480 A | * | 6/1990 |
| JP | 6-15799 U | | 4/1994 |

* cited by examiner

*Primary Examiner*—Lesley Morris
*Assistant Examiner*—Bryan A Evans
(74) *Attorney, Agent, or Firm*—Birch, Stewart, Kolasch & Birch, LLP (57) ABSTRACT

A refueling operation of an all terrain vehicle can be enhanced, even when a fuel tank is arranged below a seat, without changing an entire length of the vehicle. A fuel tank is arranged below a seat. A seat concave portion with a substantially concave shape when viewed from the top is formed in the seat. A fuel filler of the fuel tank is arranged in the seat concave portion to be seen from the top. It becomes possible to perform refueling from the fuel filler without detaching the seat. Also, an overlap between the seat and the fuel filler when viewed from above is avoided, with a reduction in a seating area of the seat minimized.

20 Claims, 5 Drawing Sheets

ALL TERRAIN VEHICLE

CROSS-REFERENCE TO RELATED APPLICATIONS

This nonprovisional application claims priority under 35 U.S.C. § 119(a) on Patent Application No. 2005-252349, filed in Japan on Aug. 31, 2005, the entirety of which is incorporated herein by reference.

BACKGROUND OF THE INVENTION

1. Field of the Invention

The present invention relates to a straddle-type all terrain vehicle that is capable of traveling on an all terrain.

2. Description of Background Art

In a straddle-type three-wheel or four-wheel all terrain vehicles that is capable of traveling on an all terrain, in some cases, a fuel tank is arranged in a rear portion of a vehicle body below a seat in relation to a layout of components thereof (for example, see Japanese Utility Model Laid-open Publication No. Hei 6-15799). In such an all terrain vehicle, a fuel filler of the fuel tank is also arranged below the seat.

On the other hand, in a scooter-type vehicle, also in some cases, a fuel tank is arranged below a seat in a rear portion of a vehicle body (for example, see Japanese Patent Application Publication No. Hei 2-158480). In this case, a fuel filler cap can be seen behind the seat from above.

Incidentally, in the all terrain vehicle described in Japanese Utility Model Laid-open Publication No. Hei 6-15799, because the fuel filler of the fuel tank is arranged below the seat, it is necessary to detach the seat at the time of refueling. Therefore, there has been room for improvement in the refueling operation of such a vehicle.

On the other hand, in the scooter-type vehicle described in Japanese Patent Application Publication No. Hei 2-158480, refueling without detaching the seat is possible. Therefore, refueling of such a scooter-type vehicle is improved when compared to the all terrain vehicle described above. However, if the aforementioned structure, in which the fuel filler cap can be seen from the top behind the seat, is applied to a straddle-type all terrain vehicle, an entire length of the vehicle must be enlarged, since a seat carrier and a storage box are arranged in a rear portion of the vehicle body. Additionally, if the seat carrier is lengthened backward, a balance of the all terrain vehicle is not preferable when the vehicle is placed in the lengthwise direction to be stored.

SUMMARY OF THE INVENTION

The present invention has been made in consideration of the aforementioned situations. An object of the present invention is to provide an all terrain vehicle, which can improve the refueling operation, even when a fuel tank is arranged below the seat, and without changing an entire length of the vehicle.

For the purpose of achieving the aforementioned object, a first aspect of the present invention is directed to an all terrain vehicle that has a fuel tank arranged below a seat. A seat concave portion with a substantially concave shape when viewed from above is formed in the seat. A fuel filler of the fuel tank is arranged in the seat concave portion, and thereby, the fuel filler can be seen from an upper side of the vehicle.

According to a second aspect of the present invention, a storage box is arranged behind the seat, and the seat concave portion is formed in a rear end portion of the seat.

According to a third aspect of the present invention, a rear carrier is arranged behind the seat, and a carrier concave portion with a substantially concave shape when viewed from above is formed in the rear carrier.

According to a fourth aspect of the present invention, the fuel tank is made of resin.

According to a fifth aspect of the present invention, the fuel tank is arranged between a pair of right and left seat rails.

In the first aspect of the present invention, the seat concave portion that has a substantially concave shape when viewed from the top is formed in the seat, and in this seat concave portion, the fuel filler of the fuel tank is arranged to be seen from above. Accordingly, refueling from the fuel filler of the fuel tank can be performed without detaching the seat, and the refueling operation can be enhanced without changing an entire length of the vehicle. Additionally, since there is no need to provide a lid covering the fuel filler, a reduction in the number of components can be attempted, while the refueling operation can be further enhanced.

In the second aspect of the present invention, the storage box is arranged behind the seat, and the seat concave portion is formed in the rear end portion of the seat. Accordingly, the fuel filler of the fuel tank can be arranged in the seat concave portion in front of where the storage box is arranged, so that the seat concave portion can be seen from above. Therefore, the fuel filler of the fuel tank can be arranged behind the seat without changing either an entire length of the vehicle or an anteroposterior length of the seat. In addition, the refueling operation can be enhanced. At the same time, the functionality of the seat cushioning is not deteriorated, and the passenger seating comfort can be secured.

In the third aspect of the present invention, the rear carrier is arranged behind the seat, and the carrier concave portion that has a substantially concave shape when viewed from the top is formed in the rear carrier. Accordingly, the fuel filler of the fuel tank is arranged to be seen from above. Therefore, an overlap between the rear carrier and the fuel filler when viewed from above can be avoided. In view of this, the refueling operation can be enhanced while a reduction in load-carrying area of the rear carrier is minimized.

In the fourth aspect of the present invention, the fuel tank is made of resin. Accordingly, the fuel tank is lightweight and can be easily formed into a shape that avoids interference with the seat and the like In the fifth aspect of the present invention, the fuel tank is arranged between the pair of right and left seat rails. Accordingly, the installation operation of the fuel tank and a degree of freedom in designing a vehicle body frame are enhanced. Additionally, the vehicle body frame including the seat rail acts as a bumper, whereby it becomes possible to reduce a shock that the fuel tank receives from the outside.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will now be described with reference to the accompanying drawings. The same reference numerals will be used to identify the same or similar elements throughout the several views. It should be noted that each of the drawings should be viewed in the direction of orientation of the reference numerals.

Figure 1:
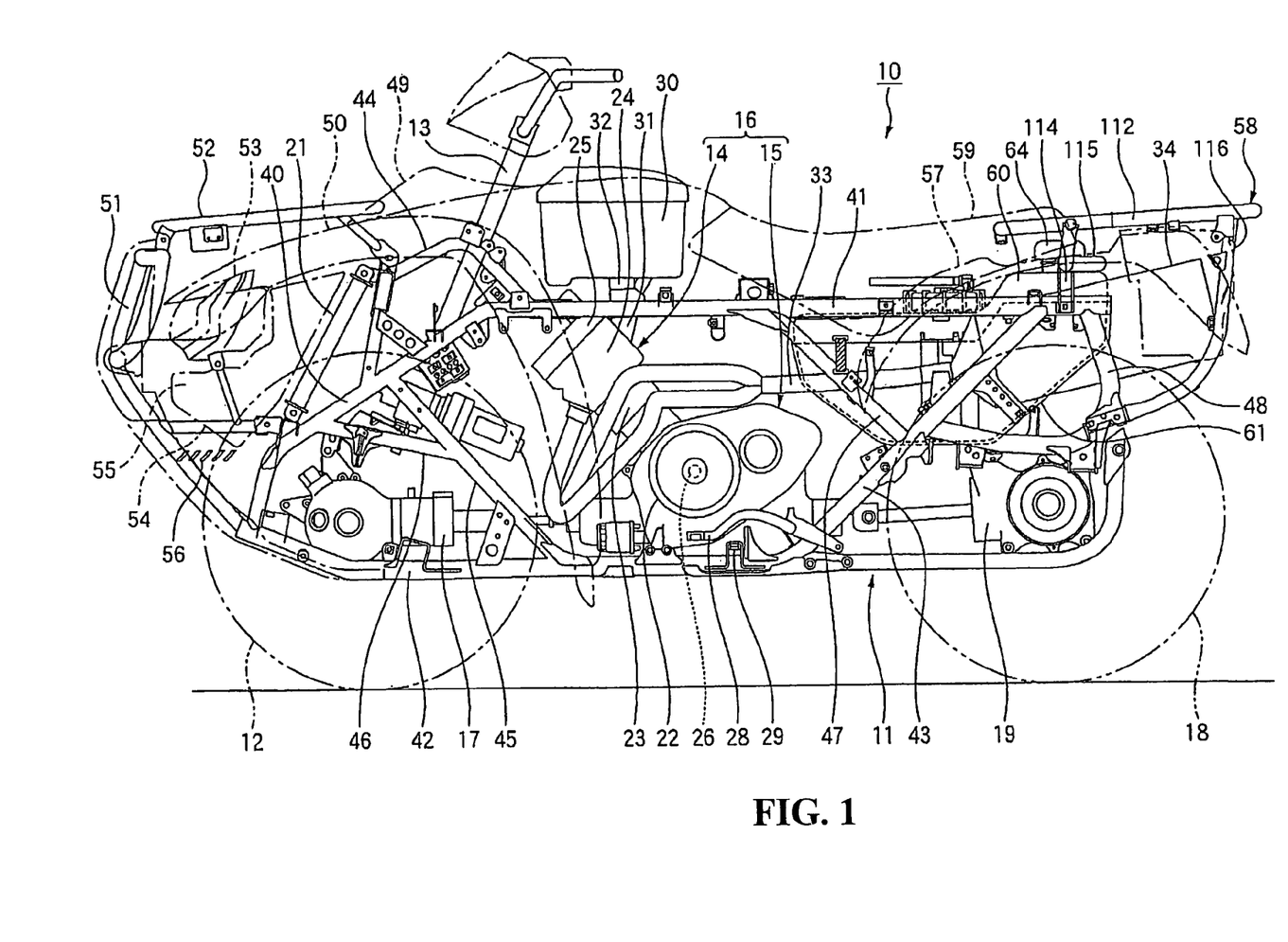
FIG. 1 is a side view of an all terrain vehicle according to an embodiment of the present invention.

FIG. 1 is a left-side view of an all terrain vehicle 10 according to an embodiment of the present invention. The all terrain vehicle 10 is a straddle-type four-wheel vehicle (so-called a buggy vehicle), and is a four wheel drive type vehicle. A steering shaft 13 used for steering right and left front wheels 12 is attached to a front portion of a vehicle body frame 11. A power unit 16 composed of an engine 14 and a transmission 15 is attached to a central portion of the vehicle body frame 11. A front-wheel driving force transmitting section 17 used for transmitting driving forces to the right and left front wheels 12 extends forward from the power unit 16. A rear-wheel driving force transmitting section 19 used for transmitting driving forces to right and left rear wheels 18 extends backward from the power unit 16.

Reference numeral 21 identifies a radiator used for cooling the engine 14. Reference numeral 22 identifies a crank case. Reference numeral 23 identifies a cylinder block. Reference numeral 24 identifies a cylinder head. Reference numeral 25 identifies a head cover. Reference numeral 26 identifies a crankshaft. Reference numeral 28 identifies a shift pedal used for operating the transmission. Reference numeral 29 identifies steps on which a passenger of the vehicle places his/her feet. Reference numeral 30 identifies an air cleaner connected to the cylinder head 24 via a connecting tube 31. Reference 32 identifies a throttle valve provided between the connecting tube 31 and the air cleaner 30. Reference 33 identifies an exhaust pipe extending backward from the cylinder head 24. Reference numeral 34 identifies a muffler connected to a rear end of the exhaust pipe 33.

The vehicle body frame 11 is provided with a pair of right and left front upper frames 40 slanted in a forward and downward direction in a front portion of the vehicle body. A pair of right and left seat rails 41 extend in a substantially horizontal and backward direction from rear end portions of the respective front upper frames 40. A pair of right and left lower flames 42 extend in the substantially horizontal and backward direction from front end portions of the respective front upper frames 40. A pair of right and left rear frames 43 are slanted in a backward and upward direction from rear portions of the respective lower frames 42 to be connected to rear portions of the respective seat rails 41.

Furthermore, the vehicle body frame 11 is provided with a pair of right and left mountain-shaped front support frames 44 connected to the respective front upper frames 40 and to the respective seat rails 41. A pair of right and left front frames 45 are slanted in the backward and downward direction while connecting intermediate points of the respective front upper frames 40 with intermediate points of the respective lower frames 42. A pair of right and left front connecting frames 46 connect the respective front upper frames 40 with the respective front frames 45. A pair of right and left rear slanted frames 47 are slanted in the backward and downward direction while connecting intermediate points of the respective seat rails 41 with intermediate points of the respective rear frames 43. A pair of right and left rear support frames 48 extend backward and thereafter extend upward to connect intermediate points of the respective rear frames 43 with rear end portions of the respective seat rails 41.

In the front portion of the vehicle body frame 11, a vehicle body cover 49, which is made of resin, covers the front portion of the vehicle body. Front fenders 50, which are also made of resin, cover regions of the respective front wheels 12 from an upper side to a rear side thereof. A front guard 51 is connected to front end portions of the respective right and left lower frames 42 and to the respective right and left front upper frames 40 and extend upward. A front carrier 52 is provided between an upper end portion of the front guard 51 and the right and left front support frames 44. A headlamp 53 is also included.

Furthermore, in the front portion of the vehicle body frame 11, the above described radiator 21 is supported by the right and left front support frames 44 and the right and left front upper frames 40. A substantially cylindrical-shaped radiator shroud 55 is disposed between the radiator 21 and the headlamp 53 and guides external air taken from an opening portion 54 in a front portion of the radiator shroud 55. Louvers 56 are located in front of and below the opening portion 54 of the radiator shroud 55. The louvers 56 are a plurality of plates each extending in a width direction of the vehicle. The plurality of plates are provided at even intervals in a forward and backward direction of the vehicle, slanted in a forward and downward direction. The louvers 56 arranged in this manner can favorably guide a traveling wind to the radiator 21, and also prevent mud and the like from infiltrating into the vehicle because they are arranged in a manner forming a planate shape with respect to a direction in which the mud and the like are splashed by the front wheels 12.

In the rear portion of the vehicle body frame 11, rear fenders 57, which are made of resin, cover regions of the respective rear wheels 18 from an upper side to a front side thereof. A rear carrier 58 is connected to the right and left seat rails 41 and to the right and left rear support frames 48. A seat 59, on which a passenger is seated, is attached between the vehicle body cover 49 and the rear carrier 58 above the rear portions of the right and left seat rails 41. A fuel tank 60, which is made of resin and used for feeding fuel to the engine 14, is arranged below the seat 59.

Figure 2:
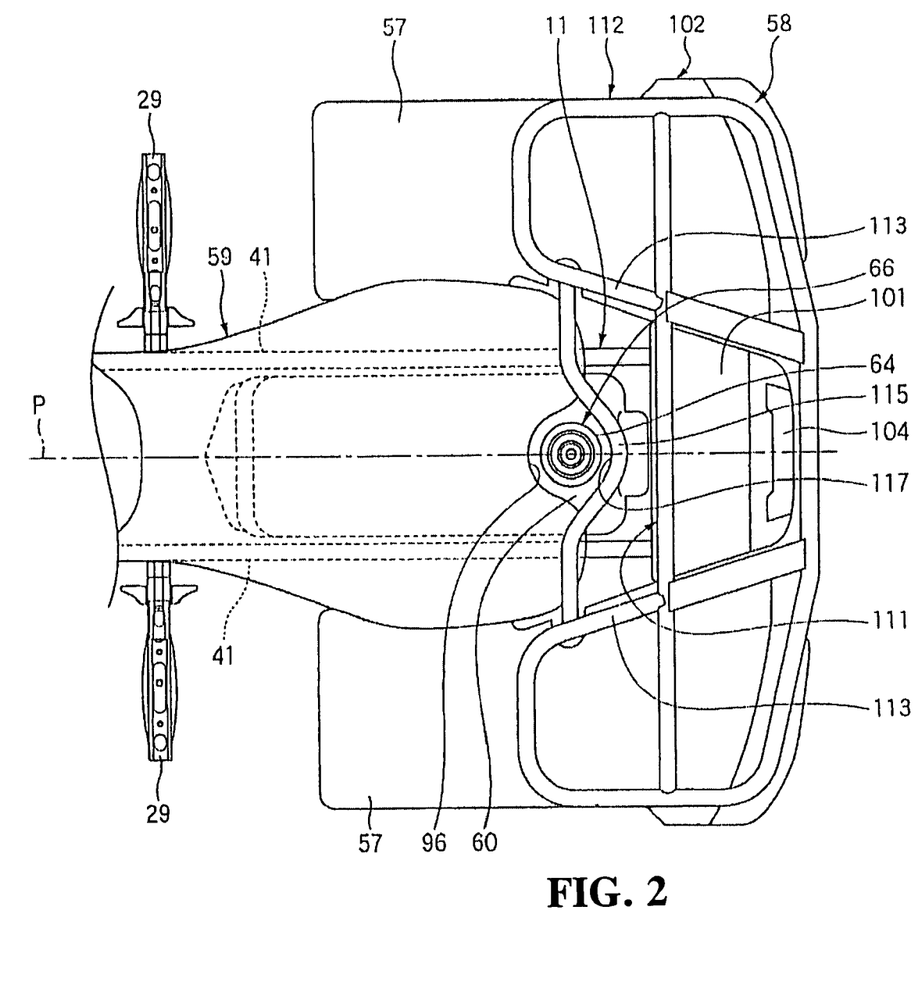
FIG. 2 is a top view of a rear portion of the all terrain vehicle according to the embodiment of the present invention.
Figure 3:
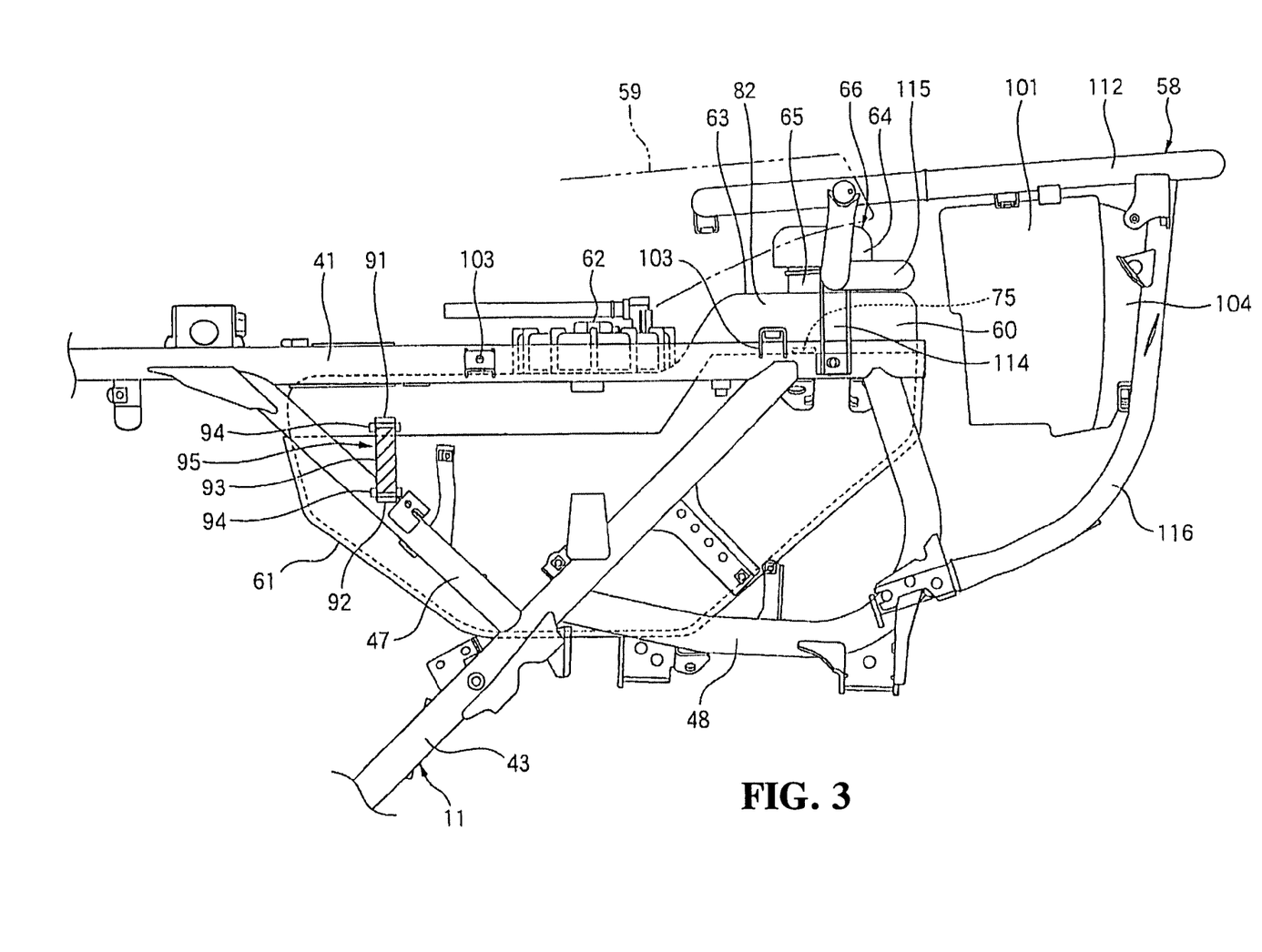
FIG. 3 is a side view showing an attachment structure of a fuel tank to a vehicle body frame in the all terrain vehicle according to the embodiment of the present invention.

As shown in FIG. 2, the fuel tank 60 is, as a whole, arranged between the pair of right and left seat rails 41 of the vehicle body frame 11, and in the rear portions of the pair of seat rails 41. More specifically, as shown in FIG. 3, the fuel tank 60 is attached in the vicinity of connecting portions among the pair of right and left seat rails 41, the pair of right and left rear frames 43, the pair of right and left rear slanted frames 47 and the pair of right and left rear support frames 48, in a state where the fuel tank 60 is partially accommodated in a tray 61 and is interposed between the respective pair of right and left seat rails 41 and the respective frames 43, 47 and 48.

The fuel tank 60 has a width measurement slightly smaller than the width between the pair of right and left seat rails 41, and has a shape in which a front portion and a rear portion thereof are slanted to narrow along a downward direction. Additionally, a fuel pump 62, which is shown in FIG. 3 and used for feeding fuel to the engine 14, is attached to a central portion of an upper surface of the fuel tank 60. Furthermore, a convex portion 63 is formed in the rear portion of the fuel tank 60 so as to be higher than the upper surface where the fuel pump 62 is attached. Moreover, a substantially cylindrical fuel filler tube 65, which is capped with a fuel filler cap 64, protrudes upward in the center of an upper surface of the convex portion 63 in the vehicle width direction, i.e., on a centerline P of the fuel tank 60 in the vehicle width direction (refer to FIG. 2). A fuel filler 66, which is an embodiment of the present invention, is composed of the fuel filler cap 64 and the fuel filler tube 65. Accordingly, the vehicle can be enhanced in appearance because the fuel filler 66 is arranged on the centerline P of the fuel tank in the vehicle width direction.

Figure 4:
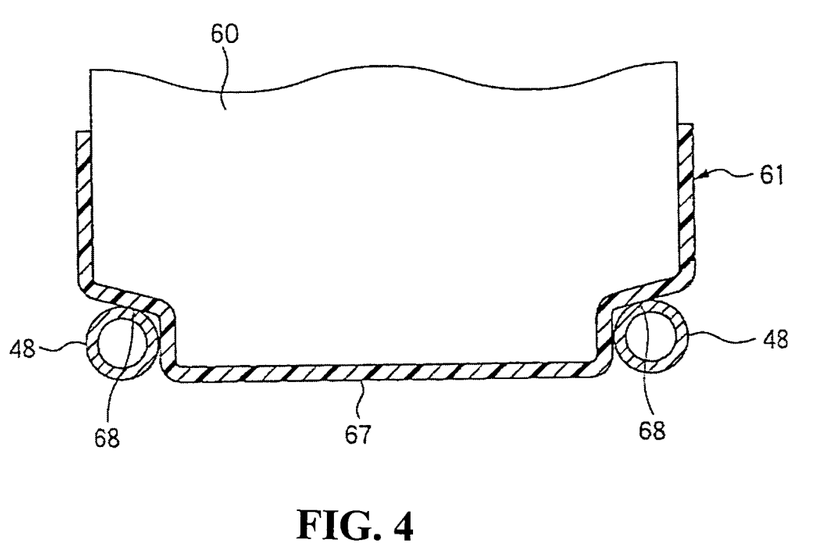
FIG. 4 is a front cross-sectional view showing an attachment structure of a lower portion of the fuel tank in the all terrain vehicle according to the embodiment of the present invention.

The tray 61 is made of resin, and has a shape recessed downwardly in the anteroposterior direction of the vehicle body in order that a lower portion of the fuel tank 60 can be accommodated in the tray 61. As shown in FIG. 4, a central portion of a bottom of the fuel tank 60 has a protruding portion 67 that protrudes downward as compared to right and left sides thereof. In a state where the protruding portion 67 is fitted into the right and left rear support frames 48, stepped portions 68 on both the right and left sides of the protruding portion 67 are mounted respectively on the right and left rear support frames 48. Accordingly, a bottom portion of the fuel tank 60 is also formed, along a shape of the tray 61, with a stepped shape in each of the sides in the vehicle width direction.

Figure 5:
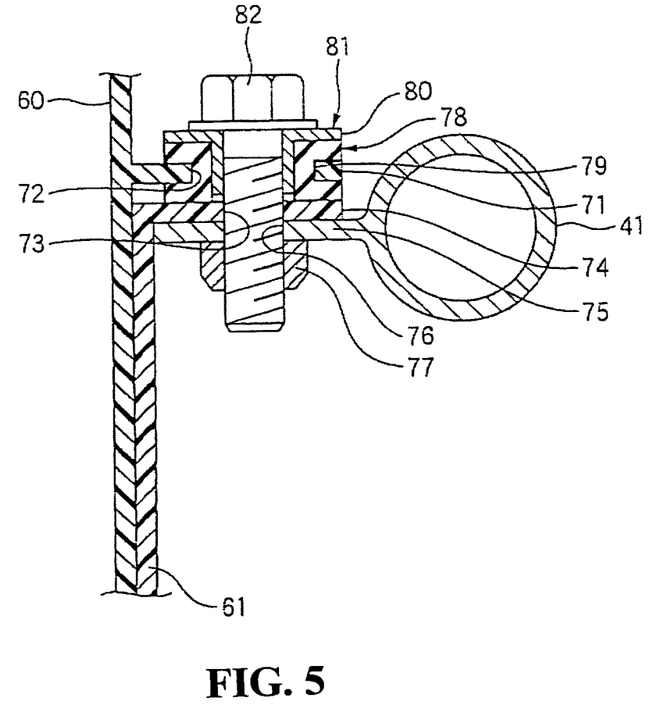
FIG. 5 is a front cross-sectional view showing an attachment structure of an upper rear portion of the fuel tank in the all terrain vehicle according to the embodiment of the present invention.

Additionally, the fuel tank 60 and the tray 61 are fastened together in the rear portions of the right and left seat rails 41. As shown in FIG. 5, respectively in right and left side surfaces of the concave portion 63, the fuel tank 60 is provided with a pair of right and left rear mounting pieces 71, which are formed integrally with the fuel tank 60 so as to protrude outward in the vehicle width direction. Mounting holes 72 are formed in the respective rear mounting pieces 71, so as to penetrate the rear mounting pieces 71 in an upward and downward direction. Additionally, a pair of right and left rear mounting pieces 74 are also formed integrally with the tray 61 in an upper edge portion in a rear potion of the tray 61 so as to protrude outward in the vehicle width direction below the respective rear mounting pieces 71. Mounting holes 73 are formed in the respective rear mounting pieces 74, so as to penetrate the rear mounting pieces 74 in the upward and downward direction.

Furthermore, in the right and left seat rails 41, mounting stays 75 protruding inward in the vehicle width direction are provided respectively at points corresponding to the rear mounting pieces 71 and 74 in the anteroposterior direction of the vehicle body. Mounting holes 76 are formed in the mounting stays 75, respectively so as to penetrate the mounting stays 75 in the upward and downward direction. Weld nuts 77 are fixed under the mounting holes 76. It should be noted that, as shown in FIG. 3, each of the mounting stays 75 is disposed at a point of each of the seat rails 41 substantially above a connecting point where the seat rail 41 is connected with the rear frame 43.

As shown in FIG. 5, a rubber piece 78 is made of rubber with a stepped cylindrical shape. An outside portion of minor diameter 79, which is located in the center of the rubber piece 78, is fitted into each of the mounting holes 72 of the rear mounting pieces 71 of the fuel tank 60. A substantially cylindrical collar 81 having a flange 80 in an upper portion thereof is inserted inside the rubber piece 78. In this state, the rear mounting pieces 71 and 74 respectively of the fuel tank 60 and of the tray 61 are arranged on each of the mounting stays 75 of the seat rails 41. Each of bolts 82 is inserted from above into each of the collars 81 and the mounting holes 72, 73 and 76 so as to be screwed into each of the weld nuts 77. As a result, the rear mounting pieces 71 of the fuel tank 60 and the rear mounting pieces 74 of the tray 61 are fastened together to the vehicle body frame 11.

Figure 6:
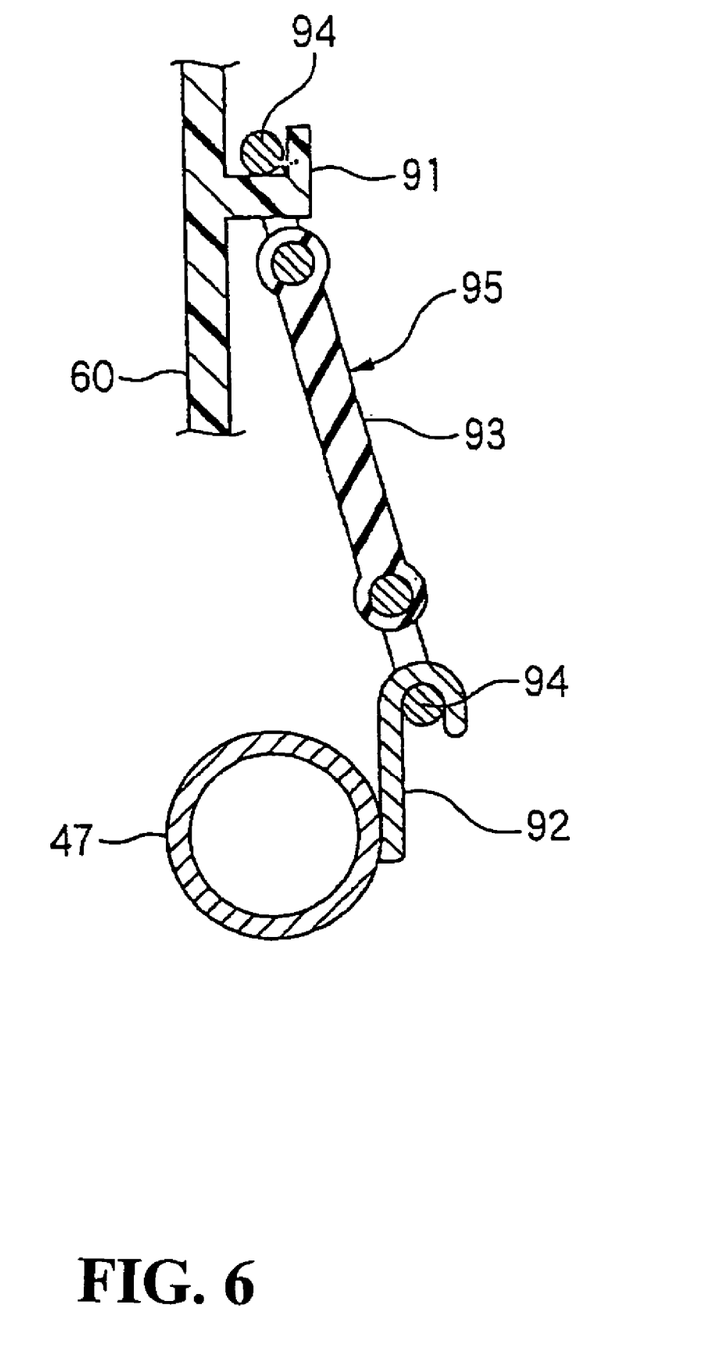
FIG. 6 is a front cross-sectional view showing an attachment structure of an upper front portion of the fuel tank in the all terrain vehicle according to the embodiment of the present invention.

As shown in FIGS. 3 and 6, on each of right and left sides of a front portion of the fuel tank 60, a locking piece portion 91 is formed integrally with the fuel tank 60. The locking piece portion 91 protrudes in the vehicle width direction and a tip end thereof bends upward. Moreover, on each of the right and left rear slanted flames 47, a locking piece portion 92 is fixed by welding below the locking piece portion 91. The locking piece 92 extends upward and is folded back downward toward the outside in the vehicle width direction. A mounting band 95 has metal square rings 94 retained respectively in both ends of a rubber band main body 93. One square ring 94 is locked to the locking piece portion 91 and the other square ring 94 is locked to the locking piece portion 92, while the band main body 93 is being stretched. Thereby, the mounting band 95 is caused to pull the fuel tank 60 downward, and thus the fuel tank 60 is pressed against and fixed to the vehicle body frame 11.

In the above described manner, the fuel tank 60 and the tray 61 are attached to the vehicle body frame 11 respectively in the front, rear, right and left portions thereof.

Additionally, as shown in FIG. 2, a seat concave portion 96, which is recessed forwardly in an arcuate form to have a substantially concave shape viewed from the top, is formed at the center of a rear end portion of the seat 59 in the vehicle width direction. The fuel filler 66 of the fuel tank 60 is arranged to be seen in the seat concave portion 96 from the top. More specifically, the fuel filler 66 is arranged such that at least a part of the fuel filler 66 enters into an area of the seat concave portion 96, when viewed from above. It should be noted that, as shown in FIG. 3, the fuel filler 66 is provided below the seat 59, so that an upper surface of the fuel filler cap 64, which is the upper end surface of the fuel filler 66, does not contact a passenger seating on the seat 59.

The pair of right and left rear fenders 57 are composed of rear covers 102 below the rear carrier 58. The rear covers 102 are connected integrally with each other with a rear storage box 101 interposed therebetween. The rear fenders 57 are attached to the vehicle body frame 11 by means of two mounting portions 103, shown in FIG. 3, respectively provided on the pair of seat rails 41. The rear storage box 101 arranged in the rear position of the seat 59 opens rearward. A lid 104, which opens and closes the rear storage box 101, is swingably attached on the rear portion of the rear storage box 101.

As shown in FIG. 2, a concave portion 111 that is recessed rearwardly is provided in the front center portion of the rear carrier 58. The rear carrier 58 is provided with a carrier main body 112, which is composed of pipes combined in a substantially grid-like structure in the same plane, in an upper portion of the rear carrier 58. A cross pipe 115 includes both ends thereof connected respectively to a pair of inner pipes 113 forming the concave portion 111 of the carrier main body 112. The cross pipe 115 extends along the vehicle width direction inside the concave portion 111 while extending downward as shown in FIG. 3, and is fixed to stays for carrier 114 attached to the respective seat rails 41. A pair of right and left rear fixing pipes 116 extend downwardly from right and left rear portions of the carrier main body 112, and then extend forwardly to be fixed to the rear support frame 48. It should be noted that each of the stays for carrier 114 is attached to a portion in the seat rail 41 between a connecting point of the seat rail 41 with the rear frame 43, and a connecting point of the seat rail 41 with the rear support frame 48.

A carrier concave portion 117 is formed with a substantially concave shape at the center portion in the vehicle width direction in the cross pipe 115 of the rear carrier 58 arranged behind the seat 59. The carrier concave portion 117 is recessed rearwardly in an arcuate form when viewed from above. The fuel filler 66 of the fuel tank 60 is arranged, to be seen from the top, in the carrier concave portion 117. More specifically, the fuel filler 66 is arranged so that at least a part thereof enters in an area of the carrier concave portion 117. Particularly, in this embodiment, as shown in FIG. 2, the seat concave portion 96 and the carrier concave portion 117 together form a closed circular shape when viewed from above. The fuel filler 66 of the filler tank 64 is arranged inside the circular shape portion.

It should be noted that, as shown in FIG. 3, the cross pipe 115 is disposed, with a small space, above the upper surface of the convex portion 63 of the fuel tank 60, and is arranged below an upper surface of the fuel filler cap 64 and slightly below a position where the fuel filler cap 64 is capped.

As described above, by forming the seat concave portion 96 in the rear portion of the seat 59, and by forming the carrier concave portion 117 in the cross pipe 115 of the rear carrier 58, the fuel filler 66 of the filler tank 60 can be seen from above, whereby it becomes possible to perform refueling from the fuel filler 66 without detaching the seat 59 at the time of refueling. Additionally, by applying this described configuration, it becomes possible to enhance the refueling operation without enlarging an entire length of the all terrain vehicle 10 and without shortening a length in the anteroposterior direction, while a reduction in load-carrying area of the rear carrier 58 is minimized.

As described hereinabove, in the all terrain vehicle 10 according to the aforementioned embodiment, the seat concave portion 96 with a substantially concave shape when viewed from above is formed in the seat 59, and the fuel filler 66 of the filler tank 60 is arranged in this seat concave portion 96 to be seen from the top. Accordingly, refueling can be performed from the fuel filler 66 without detaching the seat 59, whereby the refueling operation can be enhanced without changing an entire length of the all terrain vehicle 10. Moreover, since there is no need to provide a lid covering the fuel filler 66, a reduction in the number of components can be attempted, while the refueling operation can be further enhanced.

Additionally, the storage box 101 is arranged behind the seat 59, and the seat concave portion 96 is formed in the rear end portion of the seat 59. Accordingly, in a place where the storage box 101 is arranged, behind the seat 59, the fuel filler 66 of the filler tank 60 can be arranged, to be seen from the top, in the seat concave portion 96 formed in the rear end portion of the seat 59. Thereby, it becomes possible to arrange the fuel filler 66 of the fuel tank 60 behind the seat 59 without changing either the entire length of the all terrain vehicle 10 or the anteroposterior length of the seat 59. Thereby, while the refueling operation can be enhanced, functionality of seat cushioning is not deteriorated, and thereby, passenger seating comfort can be secured.

Moreover, the rear carrier 58 is arranged behind the seat 59, and the carrier concave portion 117 with the substantially concave shape when viewed from above is formed in the rear carrier 58. Accordingly, it becomes possible to arrange the fuel filler 66 of the filler tank 60 to be seen in this carrier concave portion 117 from the top, whereby, it becomes possible to avoid an overlap between the rear carrier 58 and the fuel filler 66 when viewed from above. Thereby, the refueling operation can be enhanced, while the reduction in load-carrying area of the rear carrier 58 is minimized.

In addition, since the fuel tank 60 is made of resin, the fuel tank 60 is lightweight, and can be easily formed into a shape avoiding interference with the seat 59 and the like.

Furthermore, since the fuel tank 60 is arranged as a whole between the pair of right and left seat rails 41, installation of the fuel tank 60 is improved, and a degree of freedom in designing a vehicle body frame is enhanced. Moreover, the vehicle body frame 11 including the seat rails 41 acts as a bumper, whereby a shock that the fuel tank 60 receives from the outside can be reduced.

Additionally, the fuel tank 60 is mounted on the tray 61, whereby, even if some fuel adheres to the fuel tank 60, the fuel can be received by the tray 61, and thereby can be prevented from reaching components below the tray 61.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An all terrain vehicle, comprising:
   a seat, said seat having a top surface including a seat concave portion formed in the top surface, the seat concave portion having a substantially concave shape when the seat top surface is viewed from above; and
   a fuel tank arranged below said seat, said fuel tank including a fuel filler attached thereto,
   wherein the fuel filler is arranged in the seat concave portion to be seen from above.

2. The all terrain vehicle according to claim 1, wherein a storage box is arranged behind the seat, and the seat concave portion is formed in a rear end portion of the seat.

3. The all terrain vehicle according to claim 1, wherein a rear carrier is arranged behind the seat, and a carrier concave portion with a substantially concave shape when viewed from above is formed in the rear carrier.

4. The all terrain vehicle according to claim 2, wherein a rear carrier is arranged behind the seat, and a carrier concave portion with a substantially concave shape when viewed from above is formed in the rear carrier.

5. The all terrain vehicle according to claim 1, wherein the fuel tank is arranged between a pair of right and left seat rails.

6. The all terrain vehicle according to claim 1, wherein the fuel tank is arranged above rear wheels of the vehicle, and the fuel filler is located between the rear wheels and on a longitudinal center line of the vehicle.

7. The all terrain vehicle according to claim 3, wherein the seat concave portion and the carrier concave portion form a closed circular shape when viewed from above, and the fuel filler is located inside the closed circular shape.

8. The all terrain vehicle according to claim 4, wherein the seat concave portion and the carrier concave portion form a closed circular shape when viewed from above, and the fuel filler is located inside the closed circular shape.

9. A vehicle, comprising:
   a body frame;

a power unit mounted to a central portion of the body frame;

at least one front wheel mounted to a front of the body frame;

a pair of rear wheels mounted to a rear of the body frame;

a seat mounted to the rear of the body frame, said seat having a top surface including a seat concave portion formed in the top surface, the seat concave portion having a substantially concave shape when the top surface is viewed from above; and a fuel tank arranged below said seat on the rear of the body frame, said fuel tank including a fuel filler attached thereto, wherein the fuel filler is arranged in the seat concave portion to be seen from above.

10. The vehicle according to claim 9, wherein a storage box is arranged behind the seat, and the seat concave portion is formed in a rear end portion of the seat.

11. The vehicle according to claim 9, wherein a rear carrier is arranged behind the seat, and a carrier concave portion with a substantially concave shape when viewed from above is formed in the rear carrier.

12. The vehicle according to claim 10, wherein a rear carrier is arranged behind the seat, and a carrier concave portion with a substantially concave shape when viewed from above is formed in the rear carrier.

13. The vehicle according to claim 9, wherein the fuel tank is arranged between a pair of right and left seat rails.

14. The vehicle according to claim 9, wherein the fuel tank is arranged above the rear wheels of the vehicle, and the fuel filler is located between the rear wheels and on a longitudinal center line of the vehicle.

15. The vehicle according to claim 11, wherein the seat concave portion and the carrier concave portion form a closed circular shape when viewed from above, and the fuel filler is located inside the closed circular shape.

16. The vehicle according to claim 12, wherein the seat concave portion and the carrier concave portion form a closed circular shape when viewed from above, and the fuel filler is located inside the closed circular shape.

17. The all terrain vehicle according to claim 1, wherein the seat has a front edge, a rear edge and side edges, the concave portion being formed in the rear edge.

18. The all terrain vehicle according to claim 9, wherein the seat has a front edge, a rear edge and side edges, the concave portion being formed in the rear edge.

19. The all terrain vehicle according to claim 1, further comprising a pair of front wheels and a pair of rear wheels.

20. The all terrain vehicle according to claim 1, further comprising a pair of front wheels.

* * * * *